(12) United States Patent
Nonaka et al.

(10) Patent No.: US 10,810,448 B2
(45) Date of Patent: Oct. 20, 2020

(54) IMAGE-CAPTURING DEVICE

(71) Applicant: Hitachi Automotive Systems, Ltd., Hitachinaka-shi, Ibaraki (JP)

(72) Inventors: Shinichi Nonaka, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 81 days.

(21) Appl. No.: 16/307,557

(22) PCT Filed: Jul. 19, 2017

(86) PCT No.: PCT/JP2017/026031
§ 371 (c)(1),
(2) Date: Dec. 6, 2018

(87) PCT Pub. No.: WO2018/025632
PCT Pub. Date: Feb. 8, 2018

(65) Prior Publication Data
US 2019/0303690 A1 Oct. 3, 2019

(30) Foreign Application Priority Data
Aug. 5, 2016 (JP) .................................. 2016-154188

(51) Int. Cl.
*G06K 9/00* (2006.01)
*G01S 13/931* (2020.01)
(Continued)

(52) U.S. Cl.
CPC .......... *G06K 9/00805* (2013.01); *B60R 21/00* (2013.01); *B60W 40/10* (2013.01);
(Continued)

(58) Field of Classification Search
CPC ............... C08L 15/00; B60W 2710/18; B60W 2050/0215; B60W 2050/0292;
(Continued)

(56) References Cited

U.S. PATENT DOCUMENTS 6,186,259 B1 2/2001 Shimizu et al.
8,089,348 B2 * 1/2012 Kameyama .............. B60Q 9/00
340/438

(Continued)

FOREIGN PATENT DOCUMENTS

DE  10 2006 036 921 A1   4/2007
EP   0 899 543 A2        3/1999
(Continued)

OTHER PUBLICATIONS

Extended European Search Report issued in European Application No. 17836738.9 dated Feb. 7, 2020 (seven (7) pages).

(Continued)

*Primary Examiner* — Charlotte M Baker
(74) *Attorney, Agent, or Firm* — Crowell & Moring LLP

(57) ABSTRACT

The present invention provides an image-capturing device capable of fulfilling a complementary role to a vehicle behavior sensor when a failure occurs in the vehicle behavior sensor. The invention is characterized by being provided with: an image acquisition unit for acquiring images of the surroundings of a vehicle; a vehicle behavior inference unit for inferring vehicle behavior information on the basis of the images acquired by the image acquisition unit; a vehicle behavior acquisition unit for acquiring vehicle behavior information which has been detected by a vehicle behavior sensor; and an abnormality detection unit for detecting an abnormality in the vehicle behavior sensor by comparing the behavior information acquired by the vehicle behavior (Continued)

acquisition unit and the behavior information inferred by the vehicle behavior inference unit.

16 Claims, 4 Drawing Sheets

(51) Int. Cl.
G06K 9/32 (2006.01)
B60W 40/10 (2012.01)
B60R 21/00 (2006.01)
G01B 11/00 (2006.01)
B60W 50/029 (2012.01)

(52) U.S. Cl.
CPC .......... *B60W 50/029* (2013.01); *G01B 11/00* (2013.01); *G01S 13/931* (2013.01); *G06K 9/00798* (2013.01); *G06K 9/3241* (2013.01)

(58) Field of Classification Search
CPC .......... B60W 2520/14; B60W 2520/28; G05D 1/0088; G05D 2201/0213; G07C 5/008; B60R 21/00
USPC ............................... 382/103; 340/438; 701/1
See application file for complete search history.

(56) References Cited

U.S. PATENT DOCUMENTS

| | | |
|---|---|---|
| 2008/0180528 A1 | 7/2008 | Saito |
| 2013/0231825 A1 | 9/2013 | Chundrlik, Jr. et al. |

FOREIGN PATENT DOCUMENTS

| | | |
|---|---|---|
| EP | 1 588 910 A1 | 10/2005 |
| EP | 0 899 543 B1 | 7/2007 |
| EP | 1 588 910 B1 | 3/2012 |
| JP | 63-221228 A | 9/1988 |
| JP | 11-59461 A | 3/1999 |
| JP | 11-78946 A | 3/1999 |
| JP | 11-208939 A | 8/1999 |
| JP | 11-281352 A | 10/1999 |
| JP | 2007-15680 A | 1/2007 |
| JP | 2008-186344 A | 8/2008 |
| JP | 2011-128844 | 6/2011 |
| JP | 2011-232168 A | 11/2011 |
| WO | WO 2014/024336 A1 | 2/2014 |

OTHER PUBLICATIONS

International Search Report (PCT/ISA/210) issued in PCT Application No. PCT/JP2017/026031 dated Nov. 21, 2017 with English translation (five (5) pages).

Japanese-language Written Opinion (PCT/ISA/237) issued in PCT Application No. PCT/JP2017/026031 dated Nov. 21, 2017 (four (4) pages).

Japanese-language Office Action issued in counterpart Japanese Application No. 2018-531819 dated Aug. 6, 2019 with English translation (seven (7) pages).

Japanese-language Office Action issued in counterpart Japanese Application No. 2018-531819 dated Oct. 29, 2019 with English translation (eight (8) pages).

* cited by examiner

IMAGE-CAPTURING DEVICE

TECHNICAL FIELD

The present invention relates to an image-capturing device mounted on a vehicle and capable of grasping behavior of the vehicle.

BACKGROUND ART

In conventional vehicles, sensors that measure the state inside the vehicle to indicate behavior are generally and widely used as vehicle behavior sensors, such as a vehicle speed sensor, a steering angle sensor, and a yaw rate (rotational angular velocity) sensor. Since there are cases where correlation exists in vehicle behavior information obtained from these vehicle behavior sensors, in a case where a failure occurs in one of the vehicle behavior sensors, there are known techniques for supplementing the sensor in which the failure has occurred with information from other vehicle behavior sensors.

For example, JP H11-59461 describes a mothed for substituting a yaw rate by calculating the yaw rate from a difference between left and right wheel speeds (that is, a difference in the travelling distance per unit time of the left and right wheels) obtained by speed sensors for detecting the wheel speed when abnormality occurs in a yaw rate sensor.

CITATION LIST

Patent Literature

PTL 1: JP H11-208939 A

SUMMARY OF INVENTION

Technical Problem

However, there is a problem that a difference between the left and right wheel speeds does not reflect slippage between the tires mounted to the wheels and a road surface and that the actual yaw rate cannot be calculated in some cases when the yaw rate sensor is substituted by the wheel speed sensors of wheel speed as disclosed in JP H11-59461.

In particular, in an environment where a coefficient of friction between tires and a road surface is small, the amount of slippage increases, and thus an error increases between the yaw rate obtained by the speed sensors of the wheel speed as an alternative means and the actual yaw rate. Therefore, there are cases where an incorrect locus prediction result is obtained when information obtained by the alternative means is used as it is for example for the locus prediction of the vehicle. Thus, there is a problem that sufficient effects cannot be obtained in driving assistance or automatic driving for predicting and avoiding collision or deviation in advance on the basis of the locus prediction result.

An object of the present invention is to provide an image-capturing device capable of fulfilling a complementary role to a vehicle behavior sensor when a failure occurs in the vehicle behavior sensor.

Solution to Problem

In order to achieve the above object, the present invention includes: an image acquisition unit for acquiring images of surroundings of a vehicle; a vehicle behavior inference unit for inferring behavior information of the vehicle on the basis of the images acquired by the image acquisition unit; a vehicle behavior acquisition unit for acquiring behavior information of the vehicle which has been detected by a vehicle behavior sensor; and an abnormality detection unit for detecting an abnormality in the vehicle behavior sensor by comparing the behavior information acquired by the vehicle behavior acquisition unit and the behavior information inferred by the vehicle behavior inference unit.

Advantageous Effects of Invention

The present invention enables provision of an image-capturing device capable of fulfilling a complementary role to a vehicle behavior sensor when a failure occurs in the vehicle behavior sensor.

Problems, configurations, and effects other than those described above will be made clear from descriptions of the following embodiments.

DESCRIPTION OF EMBODIMENTS

Hereinafter, an image-capturing device according to an embodiment of the present invention will be described in detail with reference to the drawings.

First Embodiment

Figure 1:
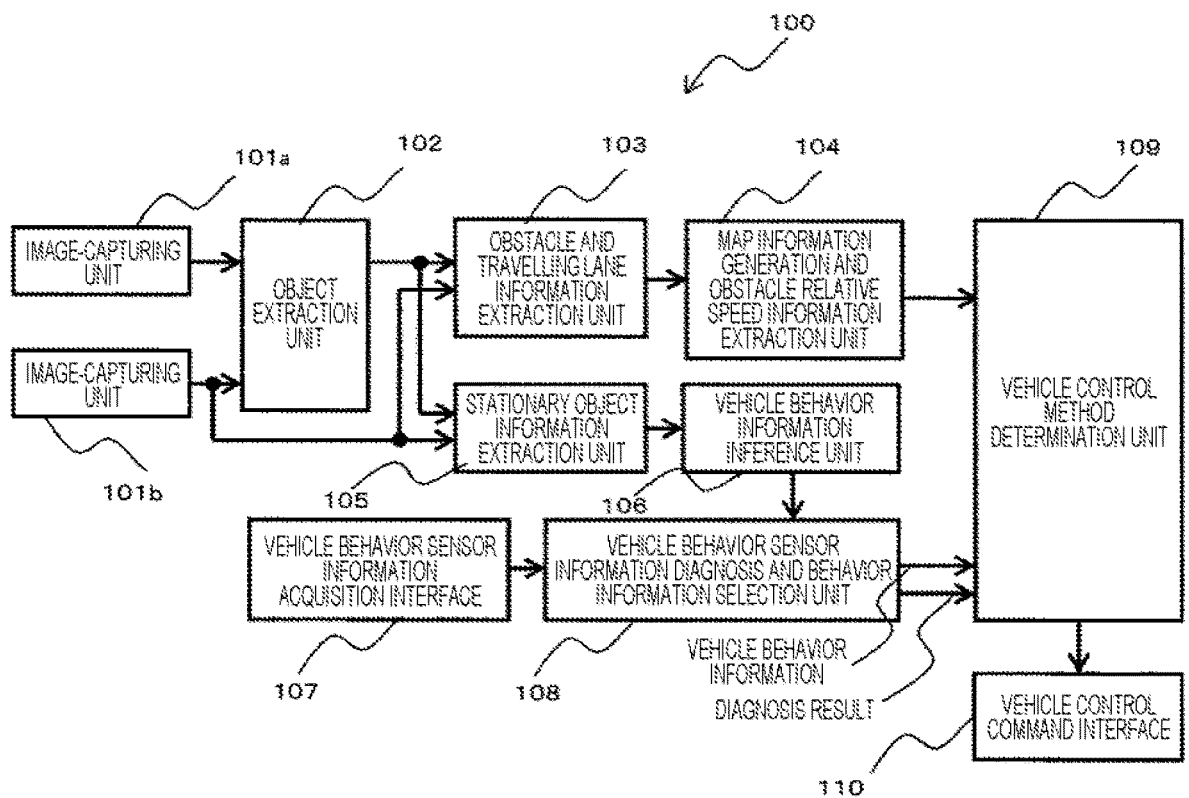
FIG. 1 is a block diagram illustrating a configuration of an image-capturing device according to a first embodiment of the present invention.

FIG. 1 is a block diagram illustrating a configuration of an image-capturing device according to a first embodiment of the present invention.

An image-capturing device 100 of the present embodiment includes image-capturing units 101a and 101b, an object extraction unit 102, an obstacle and lane information extraction unit 103, a map information generation and obstacle relative speed information extraction unit 104, a stationary object information extraction unit 105, a vehicle behavior information inference unit 106, a vehicle behavior sensor information acquisition interface 107, a vehicle behavior sensor information diagnosis and behavior information selection unit 108, a vehicle control method determination unit 109, and a vehicle control command interface 110. The object extraction unit 102, the obstacle and lane information extraction unit 103, the map information generation and obstacle relative speed information extraction unit 104, the stationary object information extraction unit 105, the vehicle behavior information inference unit 106, the vehicle behavior sensor information diagnosis and behavior information selection unit 108, and the vehicle control method determination unit 109 may be configured by a microcomputer (not illustrated) for executing software stored in advance in a storage unit (not illustrated) or may be alternatively configured by a combination of various logic circuits (not illustrated) or various ICs.

The image-capturing device 100 is mounted, for example, in a front side of a vehicle and is used as a part of a system for recognizing a traffic signal, a sign, an obstacle, etc. and implementing driving support or automatic driving. The image-capturing device 100 has two image-capturing units including an image-capturing unit 101a and an image-capturing unit 101b and thus is capable of operating as a stereo camera capable of stereoscopically acquiring external information.

As illustrated in FIG. 1, the image-capturing device 100 as a stereo camera may include the image-capturing units 101a and 101b, the object extraction unit 102, the obstacle and lane information extraction unit 103, the map information generation and obstacle relative speed information extraction unit 104, the stationary object information extraction unit 105, the vehicle behavior information inference unit 106, the vehicle behavior sensor information acquisition interface 107, the vehicle behavior sensor information diagnosis and behavior information selection unit 108, the vehicle control method determination unit 109, and the vehicle control command interface 110. Alternatively, the vehicle control method determination unit 109 and the vehicle control command interface 110 may be provided outside the image-capturing device 100. In this case, the image-capturing device 100 outputs output of the map information generation and obstacle relative speed information extraction unit 104 and output of the vehicle behavior sensor information diagnosis and behavior information selection unit 108 to the outside via an interface (e.g. CAN) (not illustrated).

The image-capturing units 101a and 101b include an imaging element (not illustrated) for converting light into an electrical signal and an optical lens (not illustrated) for forming an image of light on an imaging surface of the imaging element. Each of the image-capturing units 101a and 101b outputs images repeatedly captured at predetermined time intervals. In addition, the image-capturing units 101a and 101b are fixed to the vehicle while spaced apart by a predetermined distance toward a direction (imaging direction, for example, a travelling direction of the vehicle) for acquiring external information.

The object extraction unit 102 compares two images, an image captured by the image-capturing unit 101a and an image captured by the image-capturing unit 101b at the same time, to see a distribution of the amount of deviation (so-called parallax) and thereby extracts an area in which the object is present within an area captured by the image-capturing units 101a and 101b and acquires distance information indicating the distance to the object.

The obstacle and lane information extraction unit 103 extracts the image feature amount of the image region in which the object is present to examine similarity to feature amounts of objects registered in advance (image characteristics of vehicles, pedestrians, and other objects that can be an obstacle on traffic) and thereby identifies an object that can be an obstacle and extracts lane information indicating a road surface or road edges from the feature amount indicating features such as white lines or curbstones of the road.

The map information generation and obstacle relative speed information extraction unit 104 generates map information indicating information of a lane and the arrangement of objects that can be an obstacle present on or around the lane from the position of an object that can be an obstacle on or around the lane and the lane information obtained from the obstacle and lane information extraction unit 103 and further extracts relative speed information of the object from a change between the arrangement of the object in previous map information and the arrangement of the object in the current map information.

On the other hand, the stationary object information extraction unit 105 extracts the image feature amount of the image region in which the object extracted by the object extraction unit 102 is present to examine similarity to feature amounts of stationary objects registered in advance (image characteristics of three-dimensional objects such as road signs, direction boards, and traffic lights, as well as a pedestrian crossing indicated by paint on a road, road signs indicating a speed limit, direction regulation, etc., and structures around a road such as guardrails and buildings) and thereby specifies a stationary object and associates position information such as the distance and azimuth with the specified stationary object.

The vehicle behavior information inference unit 106 traces changes with time of the position information of the distance or the azimuth associated with the stationary object extracted by the stationary object information extraction unit 105 and thereby infers the behavior of the vehicle to the present (for example, the vehicle speed, yaw rate, etc.). For example, inference of the behavior of the vehicle from changes with time of the position information of the distance or the azimuth of the stationary object can be implemented by the following method.

Figure 2:
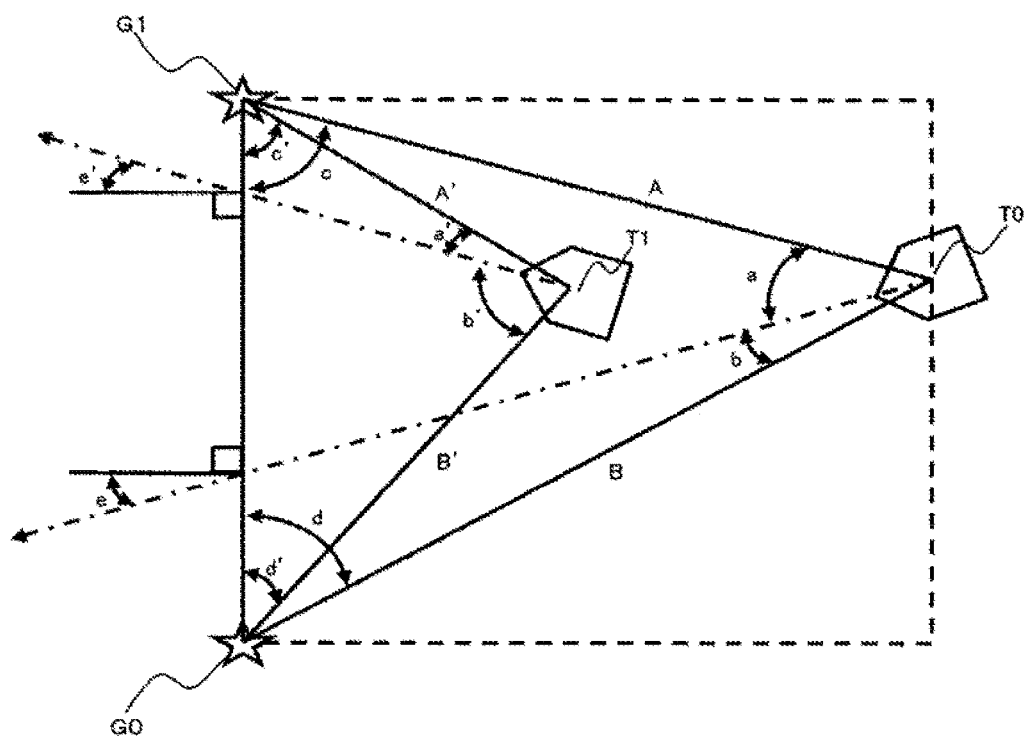
FIG. 2 is a diagram illustrating a positional relationship between a stationary object and a vehicle when two stationary objects are captured.

FIG. 2 is a diagram illustrating a positional relationship between stationary objects and a vehicle when two stationary objects are captured.

In FIGS. 2, G0 and G1 indicate positions of captured stationary objects, T0 indicates a position of the vehicle at time 0, T1 indicates a position of the vehicle one second after the time 0, and the orientation of an arrow (indicated by a one-dotted chain line) extending from the vehicle indicates a direction in which the vehicle is travelling at each of the times. Here, as for the yaw rate, a difference in orientations of the respective arrows, that is, the sum of angles "e" and "e'" at which the arrows and straight lines, which are drawn so as to be orthogonal to a straight line connecting G0 and G1, intersect at the points where the arrows crosses the straight line connecting G0 and G1 gives a turning angle per second. Moreover, since a length of an arc having coordinates of T0 and coordinates of T1 as a chord gives the movement amount per second, that is, a speed, the speed can be calculated by calculating the length of the arc from the length of the chord and the yaw rate obtained from an absolute value of the difference between a vector T0(x0, y0) from the origin G0 to T0 and a vector T1(x1, y1) from G0 to T1. The vector T0(x0, y0) from G0 to T0 and the angle "e" can be calculated in the following manner. A letter B represents a distance from G0 to T0. A letter d represents an angle formed by a straight line connecting G0 and G1 and a straight line connecting G0 and T0. A letter A represents a distance from G1 to T0. A letter c represents an angle formed by the straight line connecting G0 and G1 and a straight line connecting G1 and T0. A letter a represents an angle formed by the arrow of T0 and the straight line connecting G1 and T0. A letter b represents an angle formed by the arrow of T0 and the straight line connecting G0 and T0. A letter B' represents a distance from G0 to T1. A letter d' represents an angle formed by the straight line connecting G0 and G1 and a straight line connecting G0 and T1. A letter A' represents a distance from G1 to T1. A letter c' represents an angle formed by the straight line connecting G0 and G1 and a straight line connecting G1 and T1. A letter a' represents an angle formed by the arrow of T1 and the straight line connecting G1 and T1. A letter b' represents an angle formed by the arrow of T1 and the straight line connecting G0 and T1.

The vector T0(x0, y0) from G0 to T0 and the angle "e" can be obtained by using trigonometric functions as follows: x0=B×SIN[d]y0=B×COS[d]d=arcTAN{A×{SIN[a+b]}/{B−A{COS[a+b]}}e=0.5×π−b−d.

The vector T1(x1, y1) from G0 to T1 and the angle "e'" can be obtained by using trigonometric functions as follows: x1=B'×SIN[d']y1=B'×COS[d']d'=arcTAN{A'×{SIN[a'+b']}/{B'−A'{COS[a'+b']}}e'=0.5×π−b'−d'.

Moreover, a length (=V) of the arc connecting T0 and T1 can be calculated from the yaw rate (=Yr) and a radius of gyration (=R), and a relational equation of V={e+e'}×R holds.

The R can be calculated from the length (=L) of the chord connecting T0 and T1 by a straight line and the yaw rate. A calculation formula is as follows: R=0.5×L/COS[0.5×{e+e'}]L=√{(x1−x0)×(x1−x0)+(y1−y0)×(y1−y0)}. The vehicle behavior information inference unit 106 infers the vehicle behavior information in the above manner.

Returning to the explanation of FIG. 1, the vehicle behavior sensor information acquisition interface 107 is an interface for acquiring information from vehicle behavior sensors (not illustrated) arranged at respective positions of the vehicle (for example, a vehicle speed sensor, a steering angle sensor, a yaw rate sensor, a right wheel speed sensor, and a left wheel speed sensor) and takes in vehicle speed information, yaw rate information, steering angle information, and other information obtained by the vehicle behavior sensors into the image-capturing device 100 by using a communication means such as CAN.

The vehicle behavior sensor information diagnosis and behavior information selection unit 108 compares the vehicle behavior information inferred by vehicle behavior information inference unit 106 and vehicle behavior information from the vehicle behavior sensors obtained via the vehicle behavior sensor information acquisition interface 107 to diagnoses the accuracy of the information obtained from the vehicle behavior sensor and thereby selects and outputs vehicle behavior information depending on the diagnosis result and also outputs information notifying the composition of the output data.

For example when yaw rate information inferred by the vehicle behavior information inference unit 106 is denoted as Yrp and yaw rate information obtained from the vehicle behavior sensor is denoted as Yrs, and if a ratio of an error Yrr (="absolute value of {1−Yrs/Yrp}", for example) between Yrp and Yrs is smaller than a preset desirable determination threshold value Dy, the vehicle behavior sensor information diagnosis and behavior information selection unit 108 determines that the state of the yaw rate sensor out of the vehicle behavior sensors is good and outputs the information of the vehicle behavior sensors as it is to the vehicle control method determination unit 109 as vehicle behavior information and further notifies the vehicle control method determination unit 109 that the state of the vehicle behavior sensors is good as a diagnosis result.

Alternatively, if the ratio of the error Yrr is larger than or equal to the determination threshold value Dy, the vehicle behavior sensor information diagnosis and behavior information selection unit 108 determines that there is an abnormality in an output value of a vehicle behavior sensor (for example, the yaw rate sensor) and outputs, to the vehicle control method determination unit 109, substitute yaw rate information Yrsp calculated from detection results of other vehicle behavior sensors having correlation (for example, left and right wheel speed sensors) or yaw rate information Yrp that is the vehicle behavior information inferred by the vehicle behavior information inference unit 106 and further notifies the vehicle control method determination unit 109 that there is a problem in the state of the vehicle behavior sensor as a diagnosis result.

Furthermore, in the case where there is a problem in the state of a vehicle behavior sensor, determination in the vehicle behavior sensor information diagnosis and behavior information selection unit 108 as to whether to output the alternative yaw rate information Yrsp calculated from the detection results of the other vehicle behavior sensors to the vehicle control method determination unit 109 or to output the yaw rate information Yrp that is vehicle behavior information inferred by the vehicle behavior information inference unit 106 to the vehicle control method determination unit 109 is similar to the diagnosis of the yaw rate information Yrs obtained from the aforementioned vehicle behavior sensor (yaw rate sensor). A ratio of an error (second error ratio) between the yaw rate information Yrp which is the vehicle behavior information inferred by the vehicle behavior information inference unit 106 and the substitute yaw rate information Yrsp calculated from the detection results of the other vehicle behavior sensors is evaluated, and if the second error ratio Yrr2 is smaller than a preset desirable second determination threshold value Dy2, the substitute yaw rate information Yrsp is output to the vehicle control method determination unit 109, and if the second error ratio Yrr2 is larger than the second determination threshold value Dy2, the yaw rate information Yrp is output to the vehicle control method determination unit 109. However, even in the case where the yaw rate information Yrp inferred by the vehicle behavior information inference unit 106 is output to the vehicle control method determination unit 109, there are cases where the yaw rate information Yrp cannot be calculated depending on factors such as a capturing state of a stationary object, and thus in that case a value of the substitute yaw rate information Yrsp is output to the vehicle control method determination unit 109.

Figure 3:
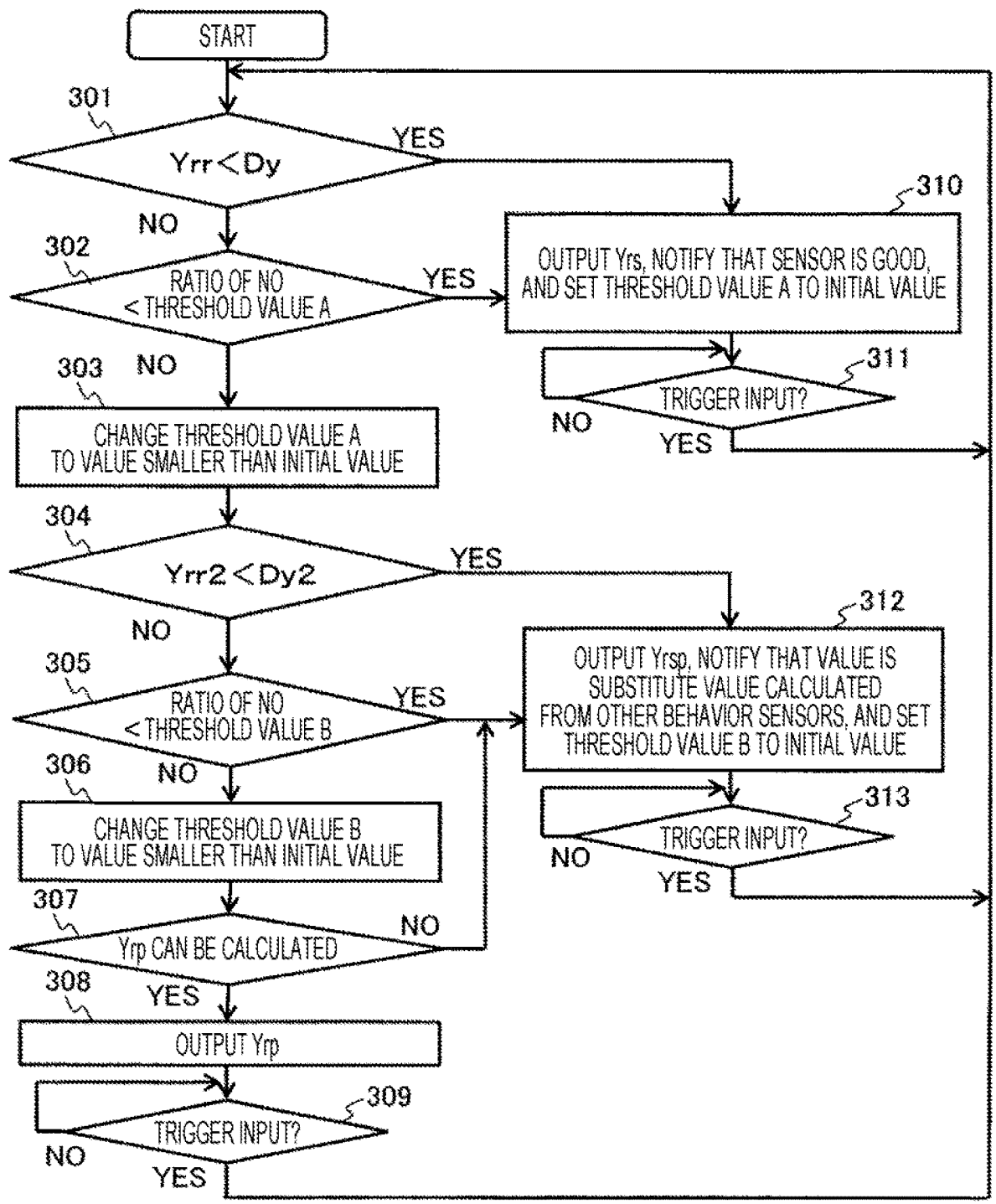
FIG. 3 is a flowchart illustrating an example of processing in a vehicle behavior sensor information diagnosis and behavior information selection unit 108 illustrated in FIG. 1.

FIG. 3 is a flowchart illustrating an example of processing in the vehicle behavior sensor information diagnosis and behavior information selection unit 108 illustrated in FIG. 1.

The diagnosis processing of the aforementioned vehicle behavior sensor and output processing based on a diagnosis result in the vehicle behavior sensor information diagnosis and behavior information selection unit 108 will be further described with reference to the flowchart of FIG. 3.

In step 301, it is determined whether the error ratio Yrr is smaller than the threshold value Dy. If it is smaller, the flow proceeds to step 310, and the yaw rate information Yrs obtained from the yaw rate sensor is output to the vehicle control method determination unit 109, and that the state of the yaw rate sensor is good is notified to the vehicle control method determination unit 109 as a diagnosis result. Moreover, a threshold value A is set to an initial value in step 310. Thereafter, in step 311, the flow waits for trigger input, that is, an elapse of a cycle in which the image processing (for example executed by timer interruption) described with reference to FIG. 2 for example, and if it elapses, the flow returns to step 301.

In step 301, if the error ratio Yrr is larger than or equal to the threshold value Dy, the flow proceeds to step 302. In step 302, the ratio of NO refers to a ratio of the number of times when YES is obtained in the determination in step 301 (the error ratio Yrr is smaller than the threshold value Dy) and the number of times when NO is obtained (the error ratio Yrr is larger than or equal to the threshold value Dy). As the number of times of NO increases, the ratio of NO increases. In step 302, it is determined whether the ratio of NO is smaller than the threshold value A. This is to exclude cases where the yaw rate information Yrs obtained from the yaw rate sensor temporarily indicates an abnormal value due to noise or the like.

In step 302, if the ratio of NO is smaller than the threshold value A, the flow proceeds to step 310, and the yaw rate information Yrs obtained from the yaw rate sensor is output to the vehicle control method determination unit 109, and that the state of the yaw rate sensor is good is notified to the vehicle control method determination unit 109 as a diagnosis result. Moreover, a threshold value A is set to an initial value in step 310.

Thereafter, in step 311, the flow waits for trigger input, that is, an elapse of the cycle in which the image processing (for example executed by timer interruption) described with reference to FIG. 2 for example, and if it elapses, the flow returns to step 301.

In step 302, if the ratio of NO is greater than or equal to the threshold value A, the flow proceeds to step 303.

In step 303, the threshold value A is changed to a value smaller than the initial value, and then the flow proceeds to step 304.

Subsequently, in step 304, it is determined whether the error ratio Yrr2 is smaller than the threshold value Dy2. If it is smaller, the flow proceeds to step 312, and substitute yaw rate information Yrsp calculated from detection results of other vehicle behavior sensors (for example, right and left wheel speed sensors) to the vehicle control method determination unit 109, that the substitute yaw rate information Yrsp calculated from the detection results of the other vehicle behavior sensors is good is notified to the vehicle control method determination unit 109 as a diagnosis result, and that the substitute yaw rate information Yrsp calculated from the detection results of the other vehicle behavior sensors has been output is notified to the vehicle control method determination unit 109. In step 312, a threshold value B is set to an initial value. Thereafter, in step 313, the flow waits for trigger input, that is, an elapse of a cycle in which the image processing (for example executed by timer interruption) described with reference to FIG. 2 for example, and if it elapses, the flow returns to step 301.

In step 304, if the error ratio Yrr2 is larger than or equal to the threshold value Dy2, the flow proceeds to step 305. In step 305, the ratio of NO refers to a ratio of the number of times when YES is obtained in the determination in step 304 (the error ratio Yrr2 is smaller than the threshold value Dy2) and the number of times when NO is obtained (the error ratio Yrr2 is larger than or equal to the threshold value Dy2). As the number of times of NO increases, the ratio of NO increases. In step 305, it is determined whether the ratio of NO is smaller than the threshold value B. This is to exclude cases where the substitute yaw rate information Yrsp temporarily indicates an abnormal value due to noise or the like.

In step 305, if the ratio of NO is smaller than the threshold value B, the flow proceeds to step 312, and substitute yaw rate information Yrsp is output to the vehicle control method determination unit 109, that the substitute yaw rate information Yrsp calculated from the detection results of the other vehicle behavior sensors is good is notified to the vehicle control method determination unit 109 as a diagnosis result, and that the substitute yaw rate information Yrsp calculated from the detection results of the other vehicle behavior sensors has been output is notified to the vehicle control method determination unit 109. In step 312, a threshold value B is set to an initial value. Thereafter, in step 313, the flow waits for trigger input, that is, an elapse of a cycle in which the image processing (for example executed by timer interruption) described with reference to FIG. 2 for example, and if it elapses, the flow returns to step 301.

In step 305, if the ratio of NO is greater than or equal to the threshold value B, the flow proceeds to step 306.

In step 306, the threshold value B is changed to a value smaller than the initial value, and then the flow proceeds to step 307.

Subsequently, in step 307, it is determined whether yaw rate information Yrp that is vehicle behavior information inferred by the vehicle behavior information inference unit 106 can be calculated. As described above, there are cases where the yaw rate information Yrp cannot be calculated due to factors such as a capturing state of a stationary object on the basis of the images captured by the image-capturing units 101a and 101b. In step 307, if the yaw rate information Yrp cannot be calculated, the flow proceeds to step 312. In step 312, the substitute yaw rate information Yrsp is output to the vehicle control method determination unit 109, that the yaw rate information Yrp cannot be calculated is notified to the vehicle control method determination unit 109 as a diagnosis result, and that the substitute yaw rate information Yrsp calculated from the detection results of the other vehicle behavior sensors has been output is notified to the vehicle control method determination unit 109. Moreover, the threshold value B is set to the initial value in this step 312. Thereafter, in step 313, the flow waits for trigger input, that is, an elapse of a cycle in which the image processing (for example executed by timer interruption) described with reference to FIG. 2 for example, and if it elapses, the flow returns to step 301.

If the yaw rate information Yrp can be calculated in step 307, the flow proceeds to step 308. In step 308, the yaw rate information Yrp is output to the vehicle control method determination unit 109, that the yaw rate information Yrp can be calculated is notified to the vehicle control method determination unit 109 as a diagnosis result, and that the yaw rate information Yrp has been output is notified to the vehicle control method determination unit 109. Moreover in step 308, there are cases where the threshold value B may be set to the initial value and the threshold value B may not be changed. Thereafter, in step 309, the flow waits for trigger input, that is, an elapse of a cycle in which the image processing (for example executed by timer interruption) described with reference to FIG. 2 for example, and if it elapses, the flow returns to step 301.

Note that, in the present embodiment a yaw rate detected by the yaw rate sensor has been described as an example, however, the present invention is not limited thereto. The vehicle behavior sensor information diagnosis and behavior information selection unit 108 is capable of performing similar diagnosis on information from other vehicle behavior sensors such as a vehicle speed sensor and an acceleration sensor by utilizing the vehicle behavior information inferred by the vehicle behavior information inference unit 106 and further outputting behavior information depending on the diagnosis result.

Returning to the explanation of FIG. 1, the vehicle control method determination unit 109 compares the map information generated by the map information generation and obstacle relative speed information extraction unit 104 with a future locus of the vehicle inferred from relative speed information of an obstacle placed on the map and the vehicle behavior information to evaluate the possibility of deviation from a lane or collision with the obstacle. As a result of this evaluation, when it is determined that there is a risk of deviating from the lane or colliding with the obstacle when the current behavior state of the vehicle continues, a control command indicating a vehicle control method (steering angle adjustment or speed adjustment) for avoiding this or information indicating a command to output a warning to the driver is generated.

Furthermore, the vehicle control method determination unit 109 also implements a function of generating a control command indicating a vehicle control method for automatically travelling in a travelable area while extracting the travelable area from the map information and performing steering angle adjustment or speed adjustment.

Here, an adjustment amount of speed adjustment at the time of generating the control command indicating the vehicle control method for automatically travelling in the travelable area is set to be limited by a limit value arbitrarily set depending on the state of the vehicle behavior sensor with reference to the state of the vehicle behavior sensor diagnosed by the vehicle behavior sensor information diagnosis and behavior information selection unit 108. For example, when the state of all the vehicle behavior sensors is good (for example, when the flow reaches step 310), this is regarded as a normal travelling state (for example, if on an expressway, the maximum speed is 100 km/h, that is, the maximum speed limit of road regulations is regarded as a target). Moreover, in a case where there is a problem in the state of at least one of the vehicle behavior sensors among all the vehicle behavior sensors but it is determined that the accuracy of substitute information calculated from other correlated vehicle behavior sensors is high (for example, when YES in step 304 and the flow reaches step 312), by setting a medium speed travelling state (for example, if on an expressway the maximum speed is 50 km/h, that is, the minimum speed limit of road regulations is regarded as a target), the deviation amount between an inferred future locus of the vehicle and the actual locus that occurs due to uncertainty of the vehicle behavior information is allowed to be easily corrected by reducing the deviation amount to be reduced in terms of one processing unit time and adjusting the control amount so as to absorb the deviation amount. Furthermore, in a state in which it is determined that the accuracy of the substitute information calculated from the vehicle behavior sensors is low (for example, when NO in step 307 and the flow reaches step 312 or step 308), by setting a low speed travelling state (for example, the maximum speed is 10 km/h, that is, a slow speed) and also urging attention to other traffic such as turning on the hazard lamp, the deviation of locus can be more easily corrected than in the medium speed travelling state. This processing will be further explained with reference to FIG. 4.

Figure 4:
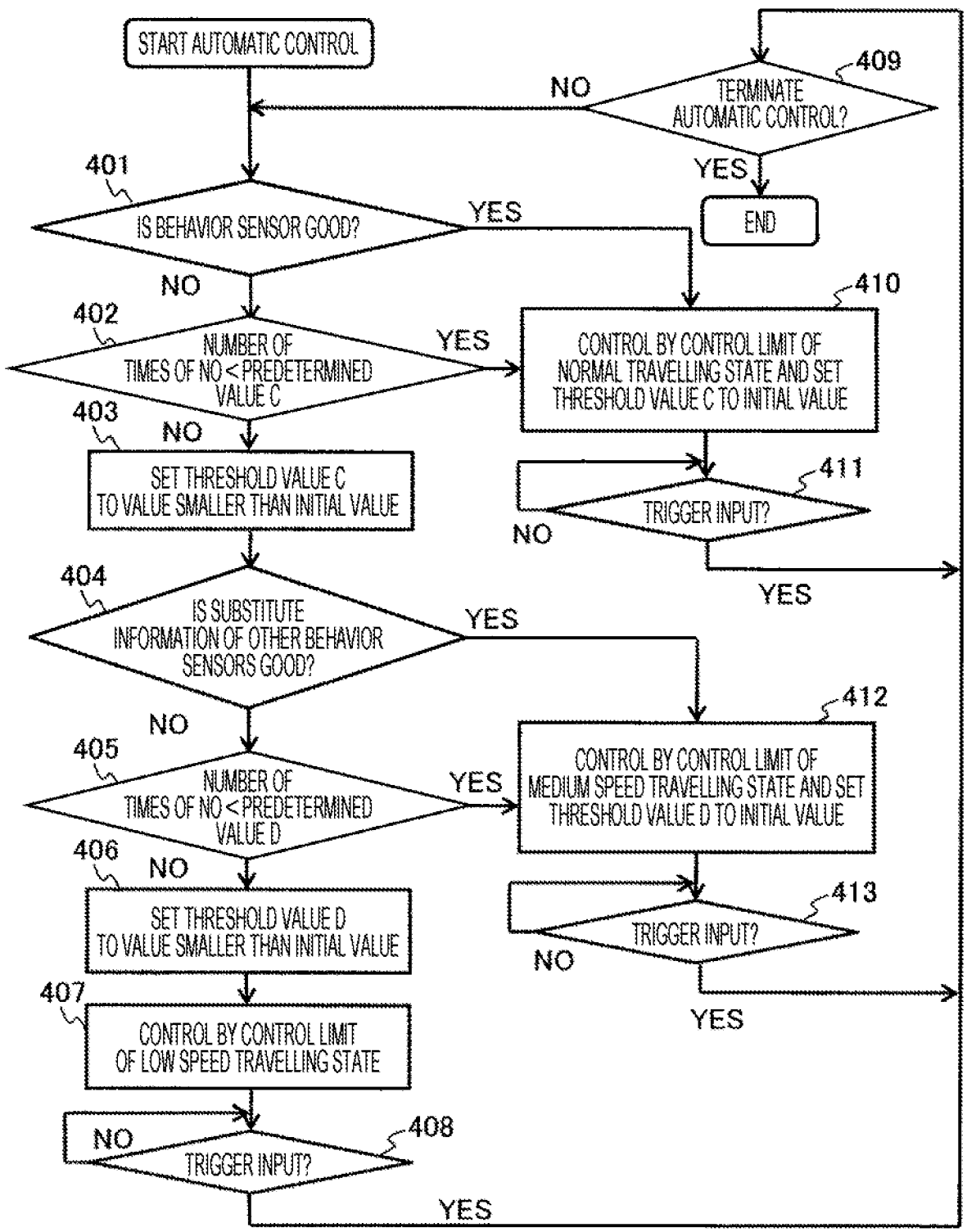
FIG. 4 is a flowchart illustrating an example of processing in a vehicle control method determination unit 109 using a diagnosis result of the vehicle behavior sensor information diagnosis and behavior information selection unit 108 illustrated in FIG. 1.

FIG. 4 is a flowchart illustrating an example of processing in the vehicle control method determination unit 109 using a diagnosis result by the vehicle behavior sensor information diagnosis and behavior information selection unit 108 illustrated in FIG. 1.

First, in step 401, it is determined whether the state of a vehicle behavior sensor (for example, a yaw rate sensor) is good, that is, whether the notification that the state of the vehicle behavior sensor is good in step 310 of FIG. 3 has been received. If it is determined as good in step 401, the flow proceeds to step 410. In step 410, it is set to perform control on the normal travelling state described above, and a threshold value C is set to an initial value. Thereafter, in step 411, the flow waits for trigger input, that is, an elapse of a cycle in which the image processing (for example executed by timer interruption) described with reference to FIG. 2 for example, and if it elapses, the flow returns to step 409. In step 409, it is determined whether the automatic control is terminated (for example, whether an automatic control termination command is given by the driver), and if the automatic control is terminated in step 409, the processing is terminated, and if the automatic control is not terminated, the process returns to step 401.

If it is determined as not good in step 401, the flow proceeds to step 402. In step 402, the number of times of NO refers to the number of times NO (the state of the vehicle behavior sensor is not good) is obtained in the determination in step 401. In step 402, it is determined whether the number of times of NO is less than the threshold value C. This is to provide hysteresis for determination of a control state such that a transition between the normal travelling state, the medium speed travelling state, and the low speed travelling state does not occur frequently due to the influence of noise.

In step 402, if the number of times of NO is smaller than the threshold value C, the flow proceeds to step 410. In step 410, it is set to perform control on the normal travelling state described above, and a threshold value C is set to an initial value. Thereafter, in step 411, the flow waits for trigger input, that is, an elapse of a cycle in which the image processing (for example executed by timer interruption) described with reference to FIG. 2 for example, and if it elapses, the flow returns to step 409. In step 409, it is determined whether the automatic control is terminated (for example, whether an automatic control termination command is given by the driver), and if the automatic control is terminated in step 409, the processing is terminated, and if the automatic control is not terminated, the process returns to step 401.

In step 402, if the number of times of NO is larger than or equal to the threshold value C, the flow proceeds to step 403.

In step 403, the threshold value C is changed to a value smaller than the initial value, then the flow proceeds to step 404.

Subsequently, in step 404, it is determined whether substitute information (for example, substitute yaw rate information Yrsp) calculated from detection results of other vehicle behavior sensors (for example, right and left wheel speed sensors) that are substitute sensors is good, that is, whether a notification has been received that the substitute information (for example, substitute yaw rate information Yrsp) calculated from the detection results of the other vehicle behavior sensors in step 312 is good in the case where YES is obtained the determination in step 304 in FIG. 3 and the flow proceeds to step 312 or the case where YES is obtained in the determination in step 305 in FIG. 3 and the flow proceeds to step 312. If it is determined as good at step 404, the flow proceeds to step 412. In step 412, it is set to perform control of the aforementioned medium speed travelling state, and the threshold value D is set to an initial value. Thereafter, in step 413, the flow waits for trigger input, that is, an elapse of a cycle in which the image processing (for example executed by timer interruption) described with reference to FIG. 2 for example, and if it elapses, the flow returns to step 409. In step 409, it is determined whether the automatic control is terminated (for example, whether an automatic control termination command is given by the driver), and if the automatic control is terminated in step 409, the processing is terminated, and if the automatic control is not terminated, the process returns to step 401.

If it is determined as not good in step 404, the flow proceeds to step 405. In step 405, the number of times of NO refers to the number of times NO (substitute information calculated from detection results of other vehicle behavior sensors is not good) is obtained in the determination in step 404. In step 405, it is determined whether the number of times of NO is smaller than the threshold value D. This is to provide hysteresis for determination of a control state such that a transition between the normal travelling state, the medium speed travelling state, and the low speed travelling state does not occur frequently due to the influence of noise.

In step 405, if the number of times of NO is smaller than the threshold value D, the flow proceeds to step 412. In step 412, it is set to perform control of the aforementioned medium speed travelling state, and the threshold value D is set to an initial value. Thereafter, in step 413, the flow waits for trigger input, that is, an elapse of a cycle in which the image processing (for example executed by timer interruption) described with reference to FIG. 2 for example, and if it elapses, the flow returns to step 409. In step 409, it is determined whether the automatic control is terminated (for example, whether an automatic control termination command is given by the driver), and if the automatic control is terminated in step 409, the processing is terminated, and if the automatic control is not terminated, the process returns to step 401.

In step 405, if the number of times of NO is larger than or equal to the threshold value D, the flow proceeds to step 406.

In step 406, the threshold value D is changed to a value smaller than the initial value, then the flow proceeds to step 407.

In step 407, it is set to perform control of the aforementioned low speed travelling state. Thereafter, in step 408, the flow waits for trigger input, that is, an elapse of a cycle in which the image processing (for example executed by timer interruption) described with reference to FIG. 2 for example, and if it elapses, the flow returns to step 409. In step 409, it is determined whether the automatic control is terminated (for example, whether an automatic control termination command is given by the driver), and if the automatic control is terminated in step 409, the processing is terminated, and if the automatic control is not terminated, the process returns to step 401.

Note that, in the low speed travelling state, it is assumed that the vehicle behavior information inferred by the vehicle behavior information inference unit 106 is used as the main vehicle behavior information, however in the case where the capturing state of a stationary object for generating the vehicle behavior information inferred by the vehicle behavior information inference unit 106 is good and the vehicle behavior information can be stably acquired, setting of the maximum speed in the low speed travelling state may be changed within a range within which the vehicle behavior information can be updated at a frequency at which feedback to the control of the vehicle sufficiently functions (that is, the image-capturing units 101a and 101b are driven at a high frame rate and the vehicle behavior information can be acquired at a frequency suitable for that).

Moreover, with respect to the limitation on the control amount of steering angle in automatic control of a vehicle, a limit value of steering angle is provided depending on a travelling speed with consideration to turning performance unique to the vehicle.

Returning to the explanation of FIG. 1, the vehicle control command interface 110 is an interface for externally outputting a control command indicating the vehicle control method generated by the vehicle control method determination unit 109 or information indicating a command to output a warning to the driver (for example, to various electronic control devices (not illustrated)). The vehicle control command interface 110 is connected to a communication network such as a CAN and outputs information indicating a control command indicating the vehicle control method generated by the vehicle control method determination unit 109 according to a network protocol or a command for outputting a warning to the driver. In various electronic control devices, automatic control of the vehicle can be executed according to various commands obtained via the vehicle control command interface 110.

In the image-capturing device 100 described above, the image-capturing units 101a and 101b are configured by a combination of an optical lens and an imaging element. A series of processing for performing external recognition processing for analyzing imaging results (captured images) of the image-capturing units 101a and 101b (e.g. object extraction unit 102, obstacle and lane information extraction unit 103, map information generation and obstacle relative speed information extraction unit 104, and stationary object information extraction unit 105), diagnosis processing of the state of behavior sensors (e.g. the vehicle behavior sensor information diagnosis and behavior information selection unit 108) using the actual vehicle behavior information from the past to the present that can be obtained from a result of external recognition (for example, obtained by the vehicle behavior information inference unit 106), selection processing of appropriate vehicle behavior information (e.g. the vehicle behavior sensor information diagnosis and behavior information selection unit 108), future behavior inference processing (e.g. the vehicle control method determination unit 109), and generation processing of an appropriate vehicle control command based on the state of a vehicle behavior sensor (e.g. the vehicle control method determination unit 109) is implemented by combining hardware logic for performing arithmetic processing, an arithmetic means such as a microcomputer, and an arithmetic processing program.

According to the image-capturing device 100 described above, it is enabled to grasp the actual vehicle behavior information from the past to the present from the result of external recognition obtained by analyzing the imaging results (captured images) of the image-capturing units 101a and 101b and to diagnose the state of vehicle behavior sensors using the actual vehicle behavior information.

Furthermore, according to the image-capturing device 100 described above, it is enabled to predict the future behavior appropriately by selecting appropriate vehicle behavior information on the basis of the diagnosis result, and thus an appropriate vehicle control command based on the state of the vehicle behavior sensors can be generated.

Second Embodiment

Figure 5:
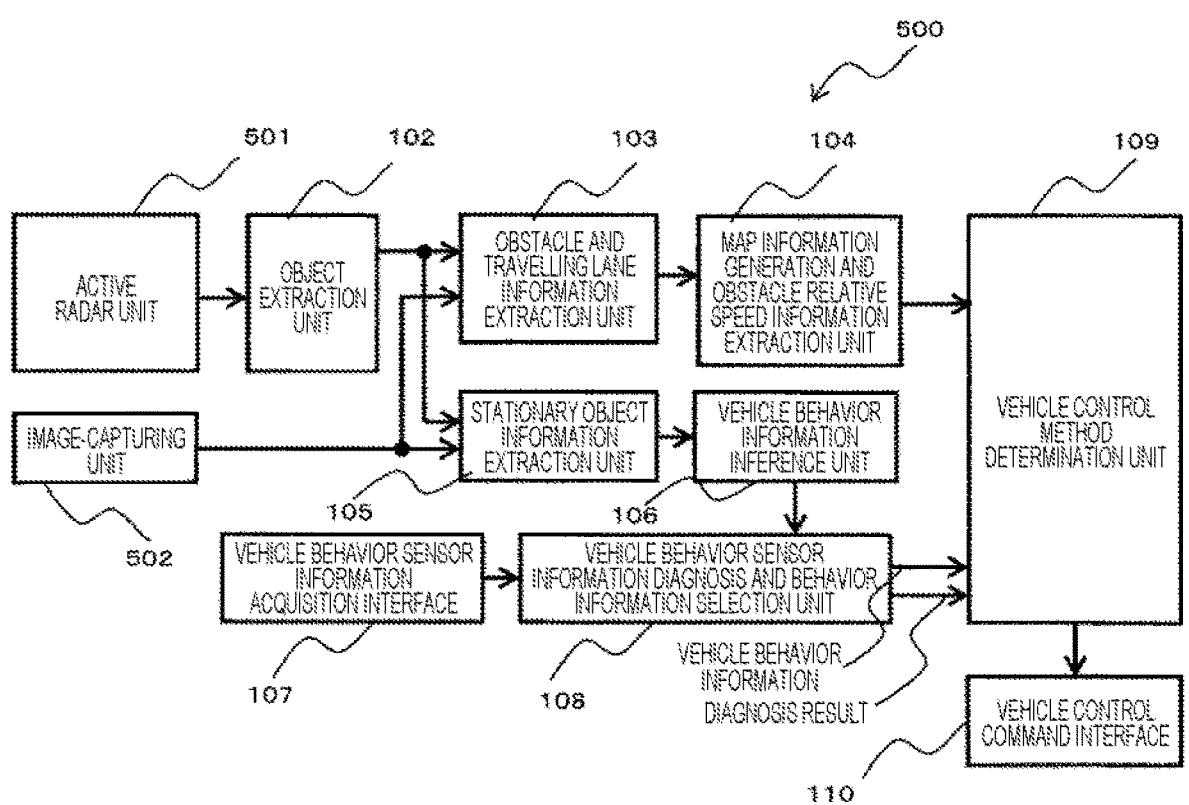
FIG. 5 is a block diagram illustrating a configuration of an image-capturing device according to a second embodiment of the present invention.

FIG. 5 is a block diagram illustrating a configuration of an image-capturing device according to a second embodiment of the present invention. In FIG. 5, components similar to those of the first embodiment illustrated in FIG. 1 are denoted by the same symbols, and detailed description thereof will be omitted.

An image-capturing device 500 according to the second embodiment includes an active radar unit 501 and an image-capturing unit 502 instead of the image-capturing units 101a and 101b of the image-capturing device 100 according to the first embodiment.

The image-capturing unit 502 has a similar configuration as that of the image-capturing unit 101b. The active radar unit 501 is a device that emits an electromagnetic wave, a laser, or the like and receives a reflected wave thereof, thereby acquiring distance information to a target.

In the first embodiment, the two image-capturing units 101a and 101b are included to perform the stereo matching processing for the purpose of grasping external information, however, the present invention is not limited to this but may include any configuration as long as external information can be grasped. For example as illustrated in FIG. 5, the active radar unit 501 may be included as an external sensor for extracting an object.

The image-capturing device 500 extracts the distance to the target or the relative speed information with respect to the target using the distance information obtained by the active radar unit 501 and identifies a direction in which the target is present and objects from the image information acquired by the image-capturing unit 502.

Note 1

Note that, the embodiment described above is:
1.
An image-capturing device including:
an image acquisition unit (e.g. image-capturing units 101a, 101b, and 502) for acquiring images of surroundings of a vehicle;
a vehicle behavior inference unit (e.g. vehicle behavior information inference unit 106) for inferring behavior information of the vehicle on the basis of the images acquired by the image acquisition unit;
a vehicle behavior acquisition unit (e.g. vehicle behavior sensor information acquisition interface 107) for acquiring behavior information of the vehicle which has been detected by a vehicle behavior sensor (e.g. yaw rate sensor, vehicle speed sensor, and acceleration sensor); and
an abnormality detection unit (e.g. vehicle behavior sensor information diagnosis and behavior information selection unit 108) for detecting an abnormality in the vehicle behavior sensor by comparing the behavior information acquired by the vehicle behavior acquisition unit and the behavior information inferred by the vehicle behavior inference unit. Therefore, it is possible to provide an image-capturing device capable of fulfilling a complementary role by detecting an abnormality when a failure occurs in a vehicle behavior sensor.

Moreover, the embodiment described above is:
b 2.
The image-capturing device according to item 1, further including:
a vehicle behavior information selection unit (e.g. vehicle behavior sensor information diagnosis and behavior information selection unit 108) for selecting either one piece of the behavior information acquired by the vehicle behavior acquisition unit or the behavior information inferred by the vehicle behavior inference unit when an abnormality is detected by the abnormality detection unit. Therefore, there are cases where erroneous control can be avoided by not selecting behavior information having an abnormality.

Moreover, the embodiment described above is:
3.
The image-capturing device according to item 2, further including:
an external information extraction unit (e.g. object extraction unit 102, obstacle and lane information extraction unit 103, map information generation and obstacle relative speed information extraction unit 104, and stationary object information extraction unit 105) for extracting external information from the images acquired by the image acquisition unit; and
a control method determination unit (e.g. vehicle control method determination unit 109) for determining a control content of the vehicle on the basis of the behavior information selected by the vehicle behavior information selection unit and the external information extracted by the external information extraction unit. Therefore, there are cases where correct control contents can be determined by not selecting behavior information having an abnormality.

Moreover, the embodiment described above is:
4.
The image-capturing device according to item 3,
in which the vehicle behavior sensor is one of a plurality of vehicle behavior sensors,
the vehicle behavior acquisition unit acquires behavior information of the vehicle detected by each of the plurality of vehicle behavior sensors,
when an abnormality is detected in one of the plurality of vehicle behavior sensors, the abnormality detection unit performs diagnosis on another vehicle behavior sensor by comparing the behavior information of the vehicle detected by the other vehicle behavior sensor other than the one of the plurality of vehicle behavior sensors acquired by the vehicle behavior acquisition unit and the behavior information inferred by the vehicle behavior inference unit, and
the control method determination unit determines the control content on the basis of the diagnosis result of the other vehicle behavior sensor by the abnormality detection unit. Therefore, there are cases where correct control can be executed with consideration to the abnormality of the substituting sensor (the other vehicle behavior sensor).

Moreover, the embodiment described above is:
5.
The image-capturing device according to item 4,
in which the control method determination unit determines the control content on the basis of the behavior information of the vehicle detected by the other vehicle behavior sensor when the diagnosis result of the other vehicle behavior sensor by the abnormality detection unit is good. Therefore, there are cases where correct control can be executed depending on the abnormality of the substituting sensor (the other vehicle behavior sensor).

Moreover, the embodiment described above is:
6.
The image-capturing device according to item 4,
in which the control method determination unit determines the control content on the basis of the behavior information inferred by the vehicle behavior inference unit when the diagnosis result of the other vehicle behavior sensor by the abnormality detection unit is not good. Therefore, there are cases where correct control can be executed depending on the abnormality of the substituting sensor (the other vehicle behavior sensor).

Moreover, the embodiment described above is:

7.

The image-capturing device according to item 3, in which the image acquisition unit includes a plurality of image-capturing units, and the external information extraction unit extracts external information from images acquired by the plurality of image-capturing units. Therefore, there are cases where stereo photographing can be performed by the simple configuration of including the plurality of image-capturing units to extract external information with high accuracy.

Moreover, the embodiment described above is:

8.

The image-capturing device according to item 1, in which the image acquisition unit includes a plurality of image-capturing units, and the vehicle behavior inference unit infers behavior information of the vehicle on the basis of images acquired by the plurality of image-capturing units. Therefore, there are cases where stereo photographing can be performed by the simple configuration of including the plurality of image-capturing units to infer behavior information of the vehicle with high accuracy.

Note that the present invention is not limited to the embodiments described above but may include various variations.

For example, the embodiments described above are described in detail in order to facilitate understanding of the present invention, and thus the present invention is not necessarily limited to include all of the configurations having been described. A part of a configuration of one of the embodiments may be replaced with a configuration of another embodiment. Also, a configuration of an embodiment may be added with a configuration of another embodiment. Moreover, a part of a configuration of each of the embodiments may be added with, deleted of, or replaced with another configuration.

REFERENCE SIGNS LIST 101a image-capturing unit
101b image-capturing unit
102 object extraction unit
103 obstacle and lane information extraction unit
104 map information generation and obstacle relative speed information extraction unit
105 stationary object information extraction unit
106 vehicle behavior information inference unit
107 vehicle behavior sensor information acquisition interface
108 vehicle behavior sensor information diagnosis and behavior information selection unit
109 vehicle control method determination unit
110 vehicle control command interface
501 active radar unit
502 image-capturing unit

The invention claimed is:

1. An image-capturing device comprising:
    an image acquisition unit for acquiring images of surroundings of a vehicle;
    a vehicle behavior inference unit for inferring behavior information of the vehicle on the basis of the images acquired by the image acquisition unit;
    a vehicle behavior acquisition unit for acquiring behavior information of the vehicle which has been detected by a vehicle behavior sensor; and
    an abnormality detection unit for detecting an abnormality in the vehicle behavior sensor by comparing the behavior information acquired by the vehicle behavior acquisition unit and the behavior information inferred by the vehicle behavior inference unit.

2. The image-capturing device according to claim 1, further comprising:
    a vehicle behavior information selection unit for selecting either one piece of the behavior information acquired by the vehicle behavior acquisition unit or the behavior information inferred by the vehicle behavior inference unit when an abnormality is detected by the abnormality detection unit.

3. The image-capturing device according to claim 2, further comprising:
    an external information extraction unit for extracting external information from the images acquired by the image acquisition unit; and
    a control method determination unit for determining a control content of the vehicle on the basis of the behavior information selected by the vehicle behavior information selection unit and the external information extracted by the external information extraction unit.

4. The image-capturing device according to claim 3,
    wherein the vehicle behavior sensor is one of a plurality of vehicle behavior sensors,
    the vehicle behavior acquisition unit acquires behavior information of the vehicle detected by each of the plurality of vehicle behavior sensors,
    when an abnormality is detected in one of the plurality of vehicle behavior sensors, the abnormality detection unit performs diagnosis on another vehicle behavior sensor by comparing the behavior information of the vehicle detected by the other vehicle behavior sensor other than the one of the plurality of vehicle behavior sensors acquired by the vehicle behavior acquisition unit and the behavior information inferred by the vehicle behavior inference unit, and
    the control method determination unit determines the control content on the basis of the diagnosis result of the other vehicle behavior sensor by the abnormality detection unit.

5. The image-capturing device according to claim 4,
    wherein the control method determination unit determines the control content on the basis of the behavior information of the vehicle detected by the other vehicle behavior sensor when the diagnosis result of the other vehicle behavior sensor by the abnormality detection unit is good.

6. The image-capturing device according to claim 4,
    wherein the control method determination unit determines the control content on the basis of the behavior information inferred by the vehicle behavior inference unit when the diagnosis result of the other vehicle behavior sensor by the abnormality detection unit is not good.

7. The image-capturing device according to claim 3,
    wherein the image acquisition unit comprises a plurality of image-capturing units, and
    the external information extraction unit extracts external information from images acquired by the plurality of image-capturing units.

8. The image-capturing device according to claim 1,
    wherein the image acquisition unit comprises a plurality of image-capturing units, and
    the vehicle behavior inference unit infers behavior information of the vehicle on the basis of images acquired by the plurality of image-capturing units.

9. An image-capturing device comprising:
an image acquisition unit that is configured to acquire images of surroundings of a vehicle;
a vehicle behavior inference unit that is configured to infer behavior information of the vehicle on the basis of the images acquired by the image acquisition unit;
a vehicle behavior acquisition unit that is configured to acquire behavior information of the vehicle which has been detected by a vehicle behavior sensor; and
an abnormality detection unit that is configured to detect an abnormality in the vehicle behavior sensor by comparing the behavior information acquired by the vehicle behavior acquisition unit to the behavior information inferred by the vehicle behavior inference unit.

10. The image-capturing device according to claim 9, further comprising:
a vehicle behavior information selection unit that is configured to select either one piece of the behavior information acquired by the vehicle behavior acquisition unit or the behavior information inferred by the vehicle behavior inference unit when an abnormality is detected by the abnormality detection unit.

11. The image-capturing device according to claim 10, further comprising:
an external information extraction unit that is configured to extract external information from the images acquired by the image acquisition unit; and
a control method determination unit that is configured to determine a control content of the vehicle on the basis of the behavior information selected by the vehicle behavior information selection unit and the external information extracted by the external information extraction unit.

12. The image-capturing device according to claim 11, wherein the vehicle behavior sensor is one of a plurality of vehicle behavior sensors,
the vehicle behavior acquisition unit is configured to acquire behavior information of the vehicle detected by each of the plurality of vehicle behavior sensors,
when an abnormality is detected in one of the plurality of vehicle behavior sensors, the abnormality detection unit is configured to diagnose on another vehicle behavior sensor by comparing the behavior information of the vehicle detected by the other vehicle behavior sensor other than the one of the plurality of vehicle behavior sensors acquired by the vehicle behavior acquisition unit and the behavior information inferred by the vehicle behavior inference unit, and
the control method determination unit is configured to determine the control content on the basis of the diagnosis result of the other vehicle behavior sensor by the abnormality detection unit.

13. The image-capturing device according to claim 12, wherein the control method determination unit is configured to determine the control content on the basis of the behavior information of the vehicle detected by the other vehicle behavior sensor when the diagnosis result of the other vehicle behavior sensor by the abnormality detection unit is good.

14. The image-capturing device according to claim 12, wherein the control method determination unit is configured to determine the control content on the basis of the behavior information inferred by the vehicle behavior inference unit when the diagnosis result of the other vehicle behavior sensor by the abnormality detection unit is not good.

15. The image-capturing device according to claim 1, wherein the image acquisition unit comprises a plurality of image-capturing units, and
the external information extraction unit is configured to extract external information from images acquired by the plurality of image-capturing units.

16. The image-capturing device according to claim 9, wherein the image acquisition unit comprises a plurality of image-capturing units, and
the vehicle behavior inference unit is configured to inter behavior information of the vehicle on the basis of images acquired by the plurality of image-capturing units.

* * * * *